United States Patent
Levanoni et al.

(10) Patent No.: US 7,113,942 B2
(45) Date of Patent: Sep. 26, 2006

(54) SCALABLE STORAGE AND PROCESSING OF HIERARCHICAL DOCUMENTS

(75) Inventors: Yossi Levanoni, Redmond, WA (US); Wei-Lun Lo, Sammamish, WA (US); Sanjib Saha, Bellevue, WA (US); Paul Maybee, Seattle, WA (US); Bimal Mehta, Sammamish, WA (US); Lee Graber, Kirkland, WA (US); Anandhi Somasekaran, Redmond, WA (US); Akash Sagar, Redmond, WA (US); Balinder Malhi, Redmond, WA (US); Allen Zhang, Sammamish, WA (US); Siunie Sutjahjo, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 495 days.

(21) Appl. No.: 10/609,283

(22) Filed: Jun. 27, 2003

(65) Prior Publication Data

US 2004/0268244 A1   Dec. 30, 2004

(51) Int. Cl.
  *G06F 7/00* (2006.01)
(52) U.S. Cl. .......................................... 707/3; 707/100
(58) Field of Classification Search ................ 707/3, 707/100, 1, 10
  See application file for complete search history.

(56) References Cited

U.S. PATENT DOCUMENTS

| | | | | |
|---|---|---|---|---|
| 5,867,799 A * | 2/1999 | Lang et al. | ...................... | 707/1 |
| 5,907,837 A * | 5/1999 | Ferrel et al. | .................... | 707/3 |
| 6,314,427 B1 * | 11/2001 | Goldman et al. | ........... | 707/100 |
| 6,490,666 B1 * | 12/2002 | Cabrera et al. | ............. | 711/161 |
| 6,516,337 B1 * | 2/2003 | Tripp et al. | ................. | 709/202 |
| 6,523,172 B1 * | 2/2003 | Martinez-Guerra et al. | . | 717/143 |
| 6,529,932 B1 * | 3/2003 | Dadiomov et al. | ......... | 718/101 |
| 6,801,938 B1 * | 10/2004 | Bookman et al. | ........... | 709/224 |
| 6,886,014 B1 * | 4/2005 | Dasgupta | ...................... | 707/10 |
| 2001/0049675 A1 * | 12/2001 | Mandler et al. | ............... | 707/1 |
| 2002/0059367 A1 * | 5/2002 | Romero et al. | ............. | 709/203 |
| 2002/0133516 A1 * | 9/2002 | Davis et al. | ................. | 707/513 |
| 2003/0069881 A1 * | 4/2003 | Huttunen | ........................ | 707/5 |
| 2003/0101194 A1 * | 5/2003 | Rys et al. | .................... | 707/101 |
| 2003/0126117 A1 * | 7/2003 | Megiddo et al. | ................ | 707/3 |
| 2005/0044064 A1 * | 2/2005 | Haase | ............................ | 707/3 |

OTHER PUBLICATIONS

Christensen, E. et al., "Web Services Description Language (WSDL) 1.1", Ariba, International Business Machines Corporation, Microsoft, Jan. 2001, http://magnet/wsdl/wsdl_1.1.htm, 45 pages .☐☐☐☐.*

(Continued)

*Primary Examiner*—Sam Rimell
*Assistant Examiner*—Paul Kim
(74) *Attorney, Agent, or Firm*—Woodcock Washburn LLP

(57) ABSTRACT

Large messages in the form of hierarchically structured documents are processed in a streaming fashion using the ultimate consumer read requests as the driving force for the processing. The messages are partitioned into fixed length segments. The segments are processed in pipeline fashion. This processing chain includes simulating random access of hierarchical documents using stream transformations, mapping streams to a transport's native capabilities, composing streams into chains and using pipeline processing on the chains, staging fragments into a database and routing messages when complete messages have been formed, and providing tools to allow the end user to inspect partial messages.

4 Claims, 16 Drawing Sheets

OTHER PUBLICATIONS

Gibert, E., et al., "An Interleaved Clustered VLIW Processor", International Conference on Supercomputing, Proceedings of the 16th International Conference on Supercomputing, 2002, 210-219. ☐☐☐☐.*

"Messaging Transports Design Document", 2002, Microsoft Corporation, 17 pages.*

"Jupiter Parsing and Serializing Engines Design Document", 2002, Microsoft Corporation, 15 pages.*

Andrews, T. et al., "Business Process Execution Language for Web Services", *BEA Systems, International Business Machines Corporation, Microsoft Corporation, SAP AG, Siebel Systems*, Mar. 31, 2003, http://msdn.microsoft.com, 85 pages.

Christensen, E. et al., Web Services Description Language (WSDL) 1.1, *Ariba, International Business Machines Corporation, Microsoft ©, Jan. 2001*, http://magnet/wsdl/wsdl_1.1.htm, 45 pages.

Curbera, F. et al., "Unraveling the Web Services Web: An Introduction to SOAP, WSDL, and UDDI", *IEEE Internet Computing*, 2002, 6(2), 86-93.

Bilardi, G., et al. "Pipelined Memory Hierarchies: Scalable Organizations and Application Performance", *Innovative Architecture*, 2001, 45-52.

Gibert, E., et al. "An Interleaved Cache Clustered VLIW Processor", *International Conference on Supercomputing, Proceedings of the 16th International Conference on Supercomputing*, 2002, 210-219.

Thatte, S., "XLANG-Web Services for Business Process Design", *Microsoft © Corporation*, 2001, 46 pages.

XSL Transformations (XSLT) Version 1.0, *W3C®*, Nov. 19, 1999, www.w3.org/TR/xslt, 102 pages.

XML Path Language (XPath) 2.0, W3C®, May 2, 2003, www.w3.org/TR/xpath20, 205 pages.

XLANG/S-Language Specification, Version 0.55, *Microsoft l©Corporation*, 1999-2002, 146 pages.

"Messaging Transports Design Document", 2002, Microsoft © Corporation, 17 pages.

"Jupiter Messaging Pipeline Design Document", 2002, Microsoft © Corporation, 28 pages.

"Jupiter Parsing and Serializing Engines Design Document", 2002, Microsoft © Corporation, 15 pages.

* cited by examiner

```
-<books>
 -<book>
   <name>Inside ATL </name>
   <price>24 USD</price>
  </book>
 -<book>
   <name>Inside QFC</name>
   <price>5 USD</price>
   <author>John Smith</author>
  </book>
 </books>
```

Serialized representation of hierarchical document of Figure 2A in XML format

FIGURE 2B

| | | | | | | | | | | | | | | | | |
|---|---|---|---|---|---|---|---|---|---|---|---|---|---|---|---|---|
| 00000000 | 3C | 62 | 6F | 6F | 6B | 73 | 3E | 3C | 62 | 6F | 6F | 6B | 3E | 3C | 6E | 61 | <books><book><na |
| 00000010 | 6D | 65 | 3E | 49 | 6E | 73 | 69 | 64 | 65 | 20 | 41 | 54 | 4C | 3C | 2F | | me>Inside ATL </ |
| 00000020 | 6E | 61 | 6D | 65 | 3E | 3C | 70 | 72 | 69 | 63 | 65 | 3E | 32 | 34 | 20 | 55 | name><price>24 U |
| 00000030 | 53 | 44 | 3C | 2F | 70 | 72 | 69 | 63 | 65 | 3E | 3C | 2F | 62 | 6F | 6F | 6B | SD</price></book |
| 00000040 | 3E | 3C | 62 | 6F | 6F | 6B | 3E | 3C | 6E | 61 | 6D | 65 | 3E | 49 | 6E | 73 | ><book><name>Ins |
| 00000050 | 69 | 64 | 65 | 20 | 51 | 46 | 43 | 3C | 2F | 6E | 61 | 6D | 65 | 3E | 3C | 70 | ide QFC</name><p |
| 00000060 | 72 | 69 | 63 | 65 | 3E | 35 | 20 | 55 | 53 | 44 | 3C | 2F | 70 | 72 | 69 | 63 | rice>5 USD</pric |
| 00000070 | 65 | 3E | 3C | 61 | 75 | 74 | 68 | 6F | 72 | 3E | 4A | 6F | 68 | 6E | 20 | 53 | e><author>John S |
| 00000080 | 6D | 69 | 74 | 68 | 3C | 2F | 61 | 75 | 74 | 68 | 6F | 72 | 3E | 3C | 2F | 62 | mith</author></b |
| 00000090 | 6F | 6F | 6B | 3E | 3C | 2F | 62 | 6F | 6F | 6B | 73 | 3E | | | | | ook></books> |

FIGURE 2C

Token 1: Begin container node "books"
Token 2: Begin container node "book"
Token 3: Begin container node "name"
Token 4: Value node "Inside ATL"
Token 5: End container node "name"
Token 6: Begin container node "price"
Token 7: Value node "24 USD"
Token 8: End container node "price"
Token 9: End container node "book"
Token 10: Begin container node "book"
Token 11: Begin container node "name"
Token 12: Value node "Inside QFC"
Token 13: End container node "name"
Token 14: Begin container node "price"
Token 15: Value node "5 USD"
Token 16: End container node "price"
Token 17: Begin container node "author"
Token 18: Value node "John Smith"
Token 19: End container node "author"
Token 20: End container node "book"
Token 21: End container node "books"

FIGURE 2D

Mutating Interceptor Class Diagram

Re-Writer Class Diagram

SCALABLE STORAGE AND PROCESSING OF HIERARCHICAL DOCUMENTS

FIELD OF THE INVENTION

The present invention pertains generally to processing data in a hierarchical structure, and more specifically to storing and processing streaming data having a hierarchical structure.

BACKGROUND OF THE INVENTION

Web services are used by businesses to interact via distributed environments, such as the Internet or World Wide Web. Interactions between businesses are, by their very nature message driven. For example, a buyer sends a purchase order to a seller. The seller then checks its inventory to determine if it can provide the ordered items. The seller then sends an acknowledgement back to the buyer with a price. Finally, the buyer then accepts or rejects the sellers offer (and possibly places another order).

The messages are often large and contain hierarchically structured records. For example, it is not uncommon for businesses to transfer large CAD/CAM drawings internally or externally. Also many commerce web sites need to update catalogs from time to time. These catalogs are typically very large.

Traditional approaches to handling hierarchical documents usually break down completely when it comes to handling large messages. These traditional approaches typically consume so much memory that out of memory errors and other detrimental effects often occur. The lack of large message support is a concern for many web services.

In view of the foregoing, there is a need for a system and method that overcomes the limitations and drawbacks set forth above. Namely, what is needed is a method and system for processing large hierarchical documents in a manner that does not require the entire document to be available in memory.

SUMMARY OF THE INVENTION

Processing hierarchically structured streaming data in accordance with an exemplary embodiment of the present invention includes processes large messages in a streaming fashion using the ultimate consumer read requests as the driving force for processing. To accomplish this in an efficient manner, documents (also referred to as messages) embedded in the streaming data are processed in segments, rather than storing an entire document in memory. Various embodiments include simulating random access of hierarchical documents using stream transformations, mapping streams to a transport's native capabilities, composing streams into chains and using pipeline processing on the chains, staging fragments into a database and routing messages when complete messages have been formed, and providing tools to allow the end user to inspect partial messages.

A exemplary method for processing a data stream embodying a hierarchically structured document includes reading and writing the data stream into segments (the length of which is dictated by the issuer of read/write requests) of raw information that do not usually correspond to the hierarchical structure of the underlying data. These segments are processed in a pipelining fashion: a set of components are chained together whereby each honors "read" requests from its down-stream component and issues "read" requests to its up-stream component to obtain necessary input data to produce the output data "on-the-fly". To provide this level of uniformity in processing, components are usually required to trim the produced data and buffer the remaining so that they can be delivered in subsequent requests. Of course, individual component's processing (parsing, serializing, pattern matching, conversion . . . ) of these data will have to conform to this uniform model.

BRIEF DESCRIPTION OF THE DRAWINGS

The features and advantages of the present invention will be best understood when considering the following description in conjunction with the accompanying drawings, of which:

FIG. 2B is an exemplary representation of the hierarchically structured data of FIG. 2a as embodied in an xml document in accordance with an embodiment of the present invention;

FIG. 2C is a raw byte representation of a serialization of the xml document of FIG. 2B, in accordance with an exemplary embodiment of the present invention;

FIG. 2D depicts the sequence of input tokens returned by a hierarchical document streaming reading interface over the document of FIG. 2A in accordance with an exemplary embodiment of the present invention;

DETAILED DESCRIPTION OF ILLUSTRATIVE EMBODIMENTS

Processing hierarchically structured streaming data in accordance with an exemplary embodiment of the present invention includes processes large messages in a streaming fashion using the ultimate consumer read requests as the driving force for processing. Documents embedded in the streaming data are processed in segments, rather than storing an entire document in memory. Described herein are various exemplary embodiments of present invention. The embodiments include simulating random access of hierachical documents using stream transformations, mapping streams to a transport's native capabilities, composing streams into chains and using pipeline processing on the chains, staging fragments into a database and routing messages when complete messages have been formed, and providing tools to allow the end user to inspect partial messages.

Overview of A Suitable Computing System Environment

Figure 1:
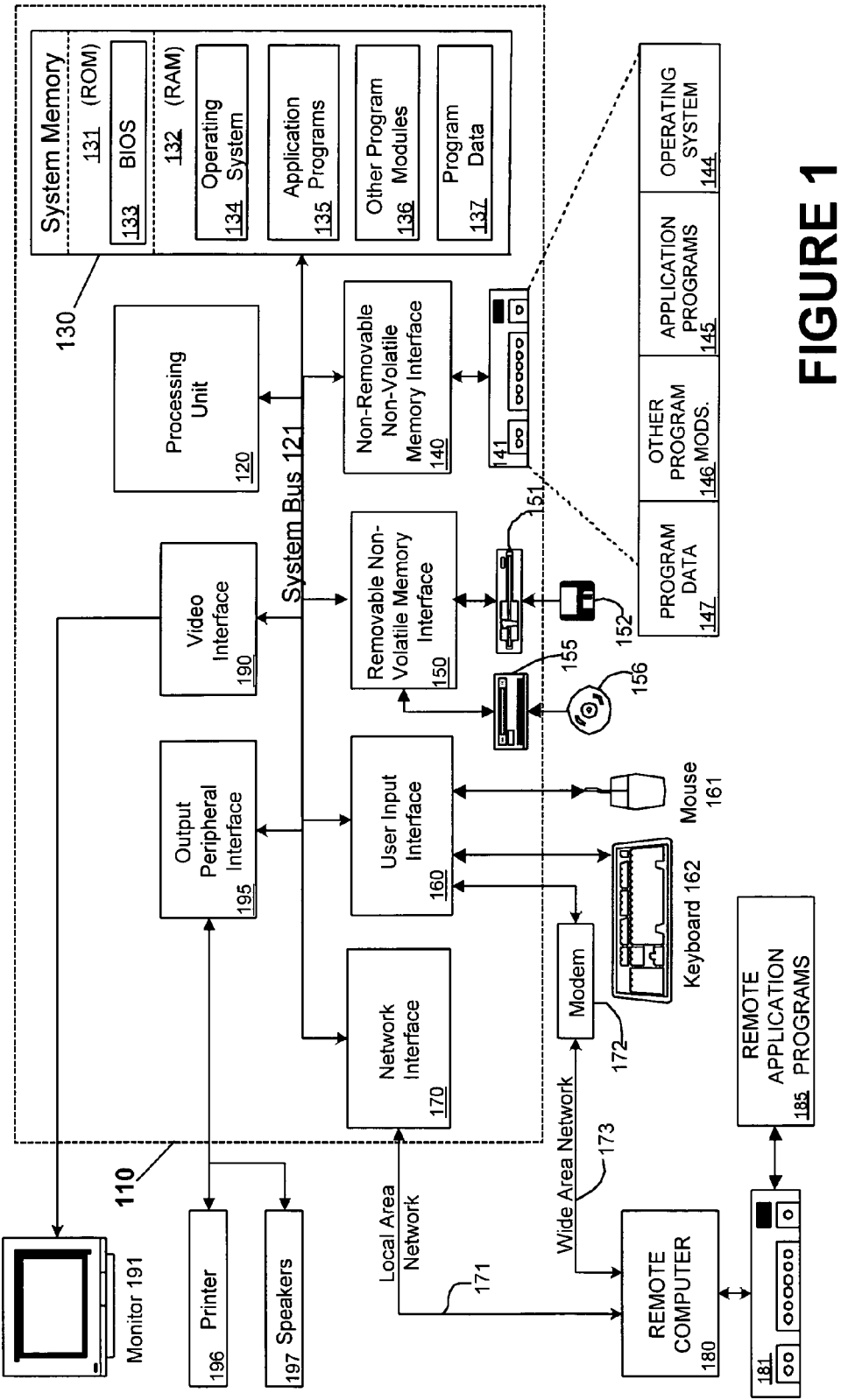
FIG. 1 illustrates an example of a suitable computing system environment in which the method and system for processing hierarchically structured streaming data in accordance with an exemplary of the present invention may be implemented.

FIG 1. illustrates an example of a suitable computing system environment 100 in which the method and system for processing hierarchically structured streaming data may be implemented. The computing system environment 100 is only one example of a suitable computing environment and is not intended to suggest any limitation as to the scope of use or functionality of the method and system for dynamically and individually controlling display elements. Neither should the computing environment 100 be interpreted as having any dependency or requirement relating to any one or combination of components illustrated in the exemplary operating environment 100.

The method and system for processing hierarchically structured streaming data are operational with numerous other general purpose or special purpose computing system environments or configurations. Examples of well known computing systems, environments, and/or configurations that may be suitable for use with the method and system for dynamically and individually controlling display elements include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The method and system for processing hierarchically structured streaming data may be described in the general context of computer-executable instructions, such as program modules, being executed by a computer. Generally, program modules include routines, programs, objects, components, data structures, etc. that perform particular tasks or implement particular abstract data types. The method and system for processing hierarchically structured streaming data may also be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 1, an exemplary system for implementing the method and system for processing hierarchically structured streaming data includes a general purpose computing device in the form of a computer 110. Components of the computer 110 may include, but are not limited to, a processing unit 120, a system memory 130, and a system bus 121 that couples various system components including the system memory 130 to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

The computer 110 typically includes a variety of computer readable media. Computer readable media can be any available media that can be accessed by computer 110 and includes both volatile and non-volatile media, removable and non-removable media. By way of example, and not limitation, computer readable media may comprise computer storage media and communication media. Computer storage media includes volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. It is to be understood that combinations of any of the media are also included within the scope of computer readable media.

The system memory 130 includes computer storage media in the form of volatile and/or non-volatile memory such as ROM 131 and RAM 132. A basic input/output system 133 (BIOS), containing the basic routines that help to transfer information between elements within computer 110, such as during start-up, are typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/non-volatile computer storage media. By way of example only, FIG. 1 illustrates a hard disk drive 141 that reads from or writes to non-removable, non-volatile magnetic media, a magnetic disk drive 151 that reads from or writes to a removable, non-volatile magnetic disk 152, and an optical disk drive 155 that reads from or writes to a removable, non-volatile optical disk 156, such as a CD-ROM, CDRW, or other optical media. Other removable/non-removable, volatile/non-volatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Various distributed computing frameworks have been and are being developed in light of the convergence of personal computing and the Internet. Individuals and business users alike are provided with a seamlessly interoperable and web-enabled interface for applications and computing devices, making computing activities increasingly web browser or network-oriented.

For example, MICROSOFT®'s .NET platform includes servers, building-block services, such as web-based data storage, and downloadable device software. Generally speaking, the .NET platform provides (1) the ability to make the entire range of computing devices work together and to have user information automatically updated and synchronized on all of them, (2) increased interactive capability for web sites, enabled by greater use of XML rather than HTML, (3) online services that feature customized access and delivery of products and services to the user from a central starting point for the management of various applications, such as e-mail, for example, or software, such as Office .NET, (4) centralized data storage, which will increase efficiency and ease of access to information, as well as synchronization of information among users and devices, (5) the ability to integrate various communications media, such as e-mail, faxes, and telephones, (6) for developers, the ability to create reusable modules, thereby increasing productivity and reducing the number of programming errors, and (7) many other cross-platform integration features as well.

While exemplary embodiments herein are described in connection with software residing on a computing device, one or more portions of the method and system for dynamically and individually controlling display elements may also be implemented via an operating system, application program interface (API), or a "middle man" object between a coprocessor and requesting object, such that services may be performed by, supported in, or accessed via all of .NET's languages and services, and in other distributed computing frameworks as well.

Preliminaries

A brief introduction to some of the concepts and entities used throughout this description are provided below.

XLANG/s: XLANG/s is a language that describes the logical sequencing of business processes, as well as the implementation of the business process by using various technology components or services. XLANG/s is described in more detail in a document titled "XLANG/S Language Specification", Version 0.55, which is hereby incorporated by reference in its entirety as if presented herein. The XLANG language is expressed in Extensible Markup Language (XML). The XLANG/s Language is a modem, special purpose language used to describe business process and business protocol. It is a declarative language, and as such it defines an explicit instruction set describing and implementing steps in a business process, the relationship between those steps, their semantics, and interactions. XLANG/s code is designed to be executable, not just descriptive. Because of its declarative nature and specific semantics, the resulting executable code is deterministic; that is, the behavior of the running business process is well defined by the semantics of the collection of XLANG/s instructions. The definitions of these business processes in executable form are called orchestrations.

XPath: XPath (XML Path Language) is a language for document addressing in an XML document. XPath is described in more detail in a document titled "XML Path Language (XPath) 2.0", a W3C working draft dated May 2, 2003, which is hereby incorporated by reference in its entirety as if presented herein. XPath performs document addressing by using path notation for navigating through the hierarchical structure of an XML document.

Streams: Streams comprise byte-oriented data. A stream of data provides access to sources and sinks of information. As used herein, streams are modeled after the .Net class System.IO.Stream.

Hierarchical Document Model: A hierarchical document model contains two types of entities: container nodes and terminal value nodes (also referred to as value nodes). Container nodes are typically identified by a name. Container nodes can have additional attributes attached to them. Container nodes contain an ordered set of nested nodes which may either be other container nodes or value nodes. Value nodes are anonymous (i.e., value nodes do not have names). Each value node contains a single value drawn from a domain specific to the document model (e.g., the set of all possible Unicode strings). Both container nodes and value nodes can have an unordered set of named attributes attached to them. The set of possible attributes and their possible values are fixed for a given document model.

Hierarchical Document Streaming Components: Given a specific document model, and a read-stream for a serialized document instance, a hierarchical document streaming component parses the stream incrementally and returns a sequence of tokens representing the structure of the read document. A token can indicate (1) the start of a container node, along with the container node's name and attributes, (2) the value of a value node, or (3) the end of container node. Tokens are dynamically provided in accordance with information contained in the record and/or field definitions of the data (in the parse table). Input tokens are read one at a time and are returned to the client. In an exemplary embodiment, as tokens are read, the maximal look-ahead required is that of one token.

Hierarchical document streaming query evaluation: A component for sequential evaluation of hierarchical document queries provides a hierarchical streaming interface, as described above. When the sequential evaluation component is created, it is supplied with a set of queries. When a token is read from the document stream, it is determined if the supplied queries are satisfied by the current node.

Figure 2A:
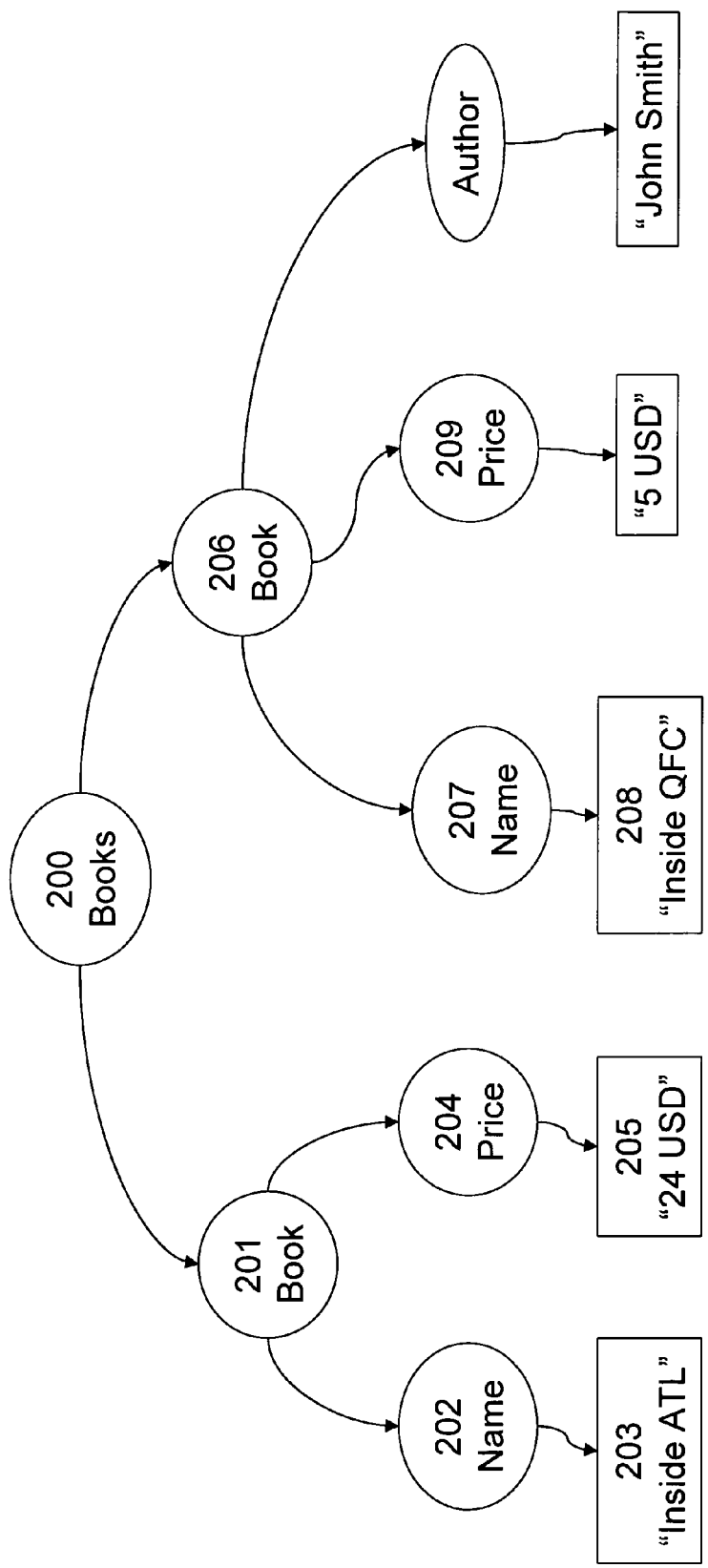
FIG. 2A is a tree diagram showing an example of hierarchically structured data, wherein each piece of data is represented as a node in accordance with an embodiment of the present invention.

Hierarchically structured data may be formatted into a serial stream. FIG. 2a is a tree diagram showing an example of hierarchically structured data, wherein each piece of data is represented as a node. Circular nodes represent container nodes and rectangular nodes represent value nodes. A high-level or "root" node 200 is shown at the top of the hierarchy, with child nodes 201 and 206. Child node 201 has two child nodes, 202 and 204. Child node 202 has a child node of type value node, numbered 203, containing the string literal "InsideATL". Etc. . . . Each of the nodes 200–209 represents a section of data within a corresponding hierarchically structured document. For example, the high-level node 200 may refer to a top-level classification (such as "List of books"), while the sub-nodes 201 and 206 may refer to a next-level classification (such as "a particular book").

FIG. 2B is the document from FIG. 2A represented as an XML instance. Note how container nodes are represented by begin and end tags, <book> and </book>, respectively, encompassing all of their descendents in the data model.

FIG. 2C is the above XML instance from FIG. 2B serialized into raw bytes. In this binary representation, each line represents 16 bytes of data. The offsets and the bytes values are given in hexadecimal notation. In the rightmost column the data bytes are printed using the corresponding ASCII symbols. Note that unlike fixed-record data structures, hierarchical data structures have varying sizes and structures for the records. For example, the two "book" records differ in their byte size and in addition in their structure. Also, the second record contains an "author" sub-record while the first one does not.

FIG. 2D is an exemplary representation of the hierarchically structured data of FIG. 2A as embodied in a data stream. When using a hierarchical document streaming reading interface, a sequence of input tokens is provided. A token is associated with each value node and with the beginning and end of each container node.

A forward only querying technique is utilized to query the stream. The hierarchical data, represented in a data stream, is examined by a query processor as the stream passes by. The query is carried out in a forward-only manner with regard to the data stream to permit querying of the hierarchical structure therein without the requirement of storing the entire hierarchical structure in memory. The query processor only needs to look at the passing data stream once assuming the query being processed is a forward query. Because only a forward query is permitted, the desired data will always occur after the reference data in the passing data stream, if the desired data occurs at all. Accordingly, the need to play back the data stream-is obviated because the query processor does not return to data in the passing data stream that it has already seen. Therefore, the need for a computer system to have a memory capable of storing the entire document that the data stream embodies is eliminated. Because such documents need not be stored in its entirety, the size of the document is not particularly relevant. While a query performed on a larger document may take longer to process than a query performed on a smaller document, the document may be queried by the computer system with minimal memory.

Figure 3A:
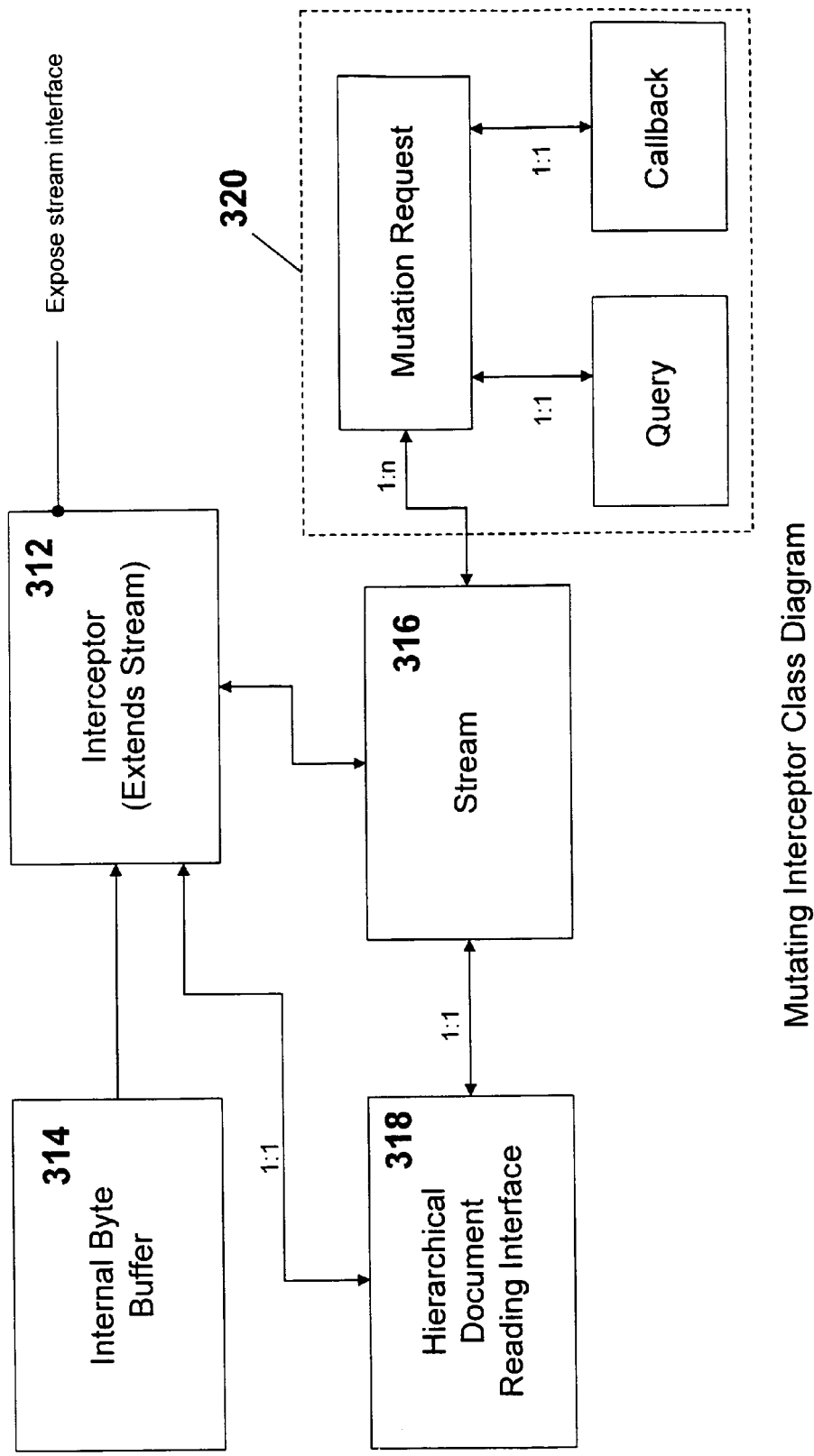
FIG. 3A is a diagram of an exemplary mutating interceptor class in accordance with an embodiment of the present invention.

Interceptors: FIG. 3 is an illustration of an exemplary mutating interceptor class. Hierarchical document interception streams 312 (also referred to as interceptors) are components that receive a document stream 314 as input and provide (expose) a stream 316 as output. Given a source stream 314, an interceptor 312 creates a document streaming component 316 for that stream. As read requests 320 are received by the interceptor 312, the interceptor 312 invokes the hierarchical document streaming component 318, which returns tokens representing the source document. These tokens can be a (1) start container node, (2) value node, or (3) end container node. For each of these tokens types there exists a virtual method on a base mutator (mutator described below). By default, each of these virtual methods serializes the given token and its attributes as-is into an in-memory queue of bytes. This process is repeated internally until enough bytes are available in the queue to satisfy the read request issued to the mutator. Any leftover in the queue are kept for the next read request issued to the interceptor. Note that the maximal amount of data that is buffered this way is bounded by the size of a single input token. Thus, the stream exposed by the base interceptor is identical, except that value nodes may have been updated, to the original stream.

Figure 3B:
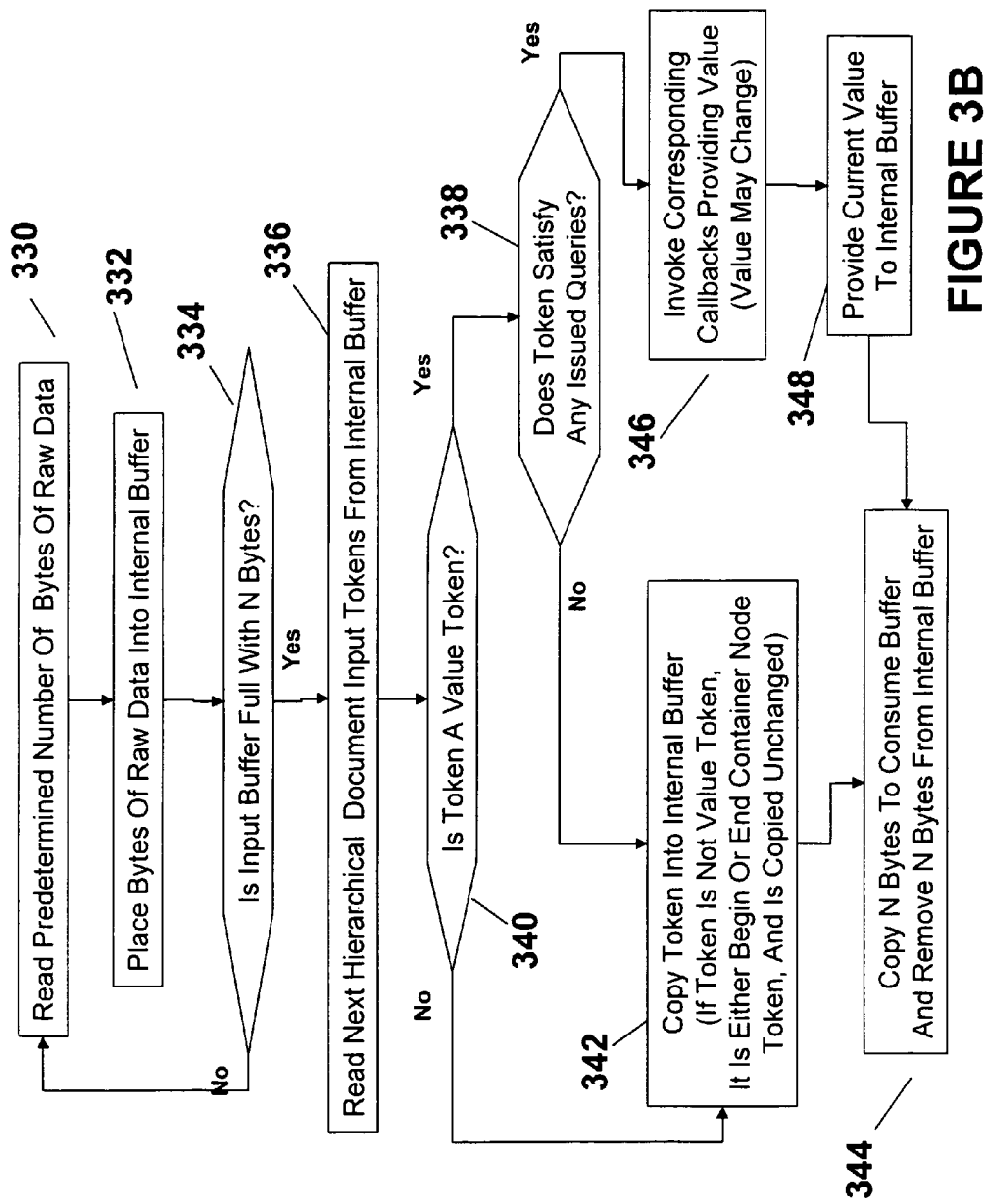
FIG. 3B is a flow diagram of an exemplary process for implementing a read operation with a mutating interceptor in accordance with an embodiment of the present invention.

FIG. 3B is a flow diagram of an exemplary process for implementing a read operation with a mutating interceptor in accordance with an embodiment of the present invention. At step 330 a chunk of raw data is read. The raw data is read in bytes of a predetermined amount. At step 332, the bytes of raw data are placed in an internal buffer. The process is repeated (step 334) until the internal buffer is full with N bytes. Preferably, N is greater than the predetermined number of bytes of raw data being read. At step 336, the next hierarchical document input token is read from the internal buffer. If this token is not a value token (step 340) then it is a token associated with either a begin or an end container node, and is copied unchanged into the internal buffer at step

342. If the token is a value token (step 340), then it is determined if the token satisfies any issued queries at step 338. If the value token does satisfy any queries, then the callbacks corresponding to the satisfied queries are invoked at step 346. The current value is provided to an internal buffer at step 348, and N bytes are removed from the internal buffer and copied into the consume buffer at step 344. If no queries are satisfied by the value token step 338, then the value token is copied back into the internal buffer at step 342. N bytes are removed from the internal buffer and copied into the consume buffer at step 344.

Two types of interceptors are provided: a schema validating interceptor and a mutating interceptor (also referred to as a mutator). A schema validating interceptor provides input tokens (tokens received by the schema validating interceptor) unchanged. However, as the input tokens are received, the schema validating interceptor verifies that the document adheres to a pre-specified schema. A mutating interceptor, or mutator, is an interceptor used to extract and/or change the value of value nodes. Upon construction, a mutator is given a set of queries and a corresponding set of callbacks. A callback is an entity processing the results of a query. Queries provided to the mutator select either value nodes in or select no nodes. Each callback expects a query, its associated value in the input stream, and optionally returns a new value for the query. Also, some callback-specific context information can be passed to the callback. As input tokens are encountered by the mutator, the following acts are performed. The start of a container node is echoed as-is from input to output and the end of a container node is echoed as-is from input to output. Whenever a value node is encountered, the mutator component checks whether this node satisfies any of the supplied queries. If so, the corresponding callbacks are invoked. The corresponding callbacks can have additional information. For example, the callback can return an alternate value for the query. The mutator component then provides the alternate value, if one was specified by the matching callbacks. The mutator component provides the original value if no query was matched or if the callbacks did not specify an alternate value. Thus, the resulting stream (provided by the mutator) is identical to the input stream (received by the mutator) except for those nodes values that were matched by queries and modified by the corresponding callbacks.

Chained Interceptors: Because an interceptor exposes (provides to the user) the same stream of data consumed by the interceptor, interceptors can be arranged in chains, wherein each interceptor provides its own transformation and/or additional information as read request are traveling up the chain from the caller to the ultimate source stream and back down the chain, when the data is traveling from the ultimate source stream to the caller through each interceptor.

Simulating Random Access of Hierarchical Documents

As mentioned above, traditional message processing methods consume so much memory that it becomes very difficult to process and store them, resulting in detrimental effects such as out-of-memory errors, or rendering the system either non-responsive or unavailable. In accordance with an embodiment of the present invention, large messages are handled throughout a processing chain by processing segments of messages in a streaming fashion using the ultimate consumer read requests as the driving force for processing. This facilitates processing by bounding the amount of memory utilized regardless of the size of the document. This also facilitates processing time estimates.

Various embodiments are manifested in the processing chain. These embodiments include simulating random access of hierarchical documents using stream transformations, mapping streams to transports' native capabilities, pipeline processing of chained streamed components, fragmented storage of data in a database, and streaming consumption of data during tracking and debugging sessions.

Streaming documents are accessed such that it appears to the requester that the access is random. When processing a message in the XLANG/s language runtime, text nodes denoted by XPath expressions are retrieved and stored using a streaming source. Read accesses are optimized using a pre-fetching mechanism with which multiple reads can be satisfied by a single pass over the data. Write requests of such fields are cached on top of the source stream and are materialized into an output stream.

Hierarchical documents, such as XML documents, comprise recursive elements and terminal value nodes. Terminal nodes can be selected for retrieval and modification using a query language, such as XPath. Unlike uniform storage, the terminal nodes of hierarchical storage are not located at predetermined offsets relative to the beginning of the document. Typically, the entire document has to be parsed to find the value of a query. An exemplary embodiment of the present invention provides the capability to read the value of a terminal node given a document and a query; write the value of a terminal node given a document, query, and a value to store; provide a stream to an output document; (e.g., a document representing the input document superimposed with all the write requests that have been applied to it); and provide cloning, (the ability to create a copy of an output document). Processing hierarchically structured streaming data in accordance with the present invention results in large documents not needing to be loaded in their entirety into memory, the number of passes over the data being kept to a minimal number of passes, and the processing of aliased queries (two different queries selecting the same underlying node). Furthermore, any of the above operations can be applied repeatedly and in any order.

In an exemplary embodiment, processing hierarchically structured streaming data comprises a stream re-writing technique wherein streams are composed into structures capturing the operations applied to the document, rather than the underlying data on which the operations are performed. Materializing the output (providing data to a client) is done only when the client ultimately requests the resulting data and even then the data is provided incrementally in segments, as the client consumes the output data. It is to be understood, that although the following description pertains to XML as the document model, and XPath as the respective query language, the technique for processing hierarchical structured streaming data as described herein, can be applied to any appropriate hierarchical document model and query language.

A request to read/write a value from/into a value node identified by a query is deemed safe if the query canonicalization procedure succeeds for the input query. Otherwise the request is unsafe. The query canonicalization procedure checks the semantics of the query to ensure that the semantics adhere to accepted semantics. If no unsafe operations are issued, caching is employed for both read and writes requests. Unsafe operations, on the other hand, cause the flushing of the caches which may necessitate going over the source data additional times.

Figure 4:
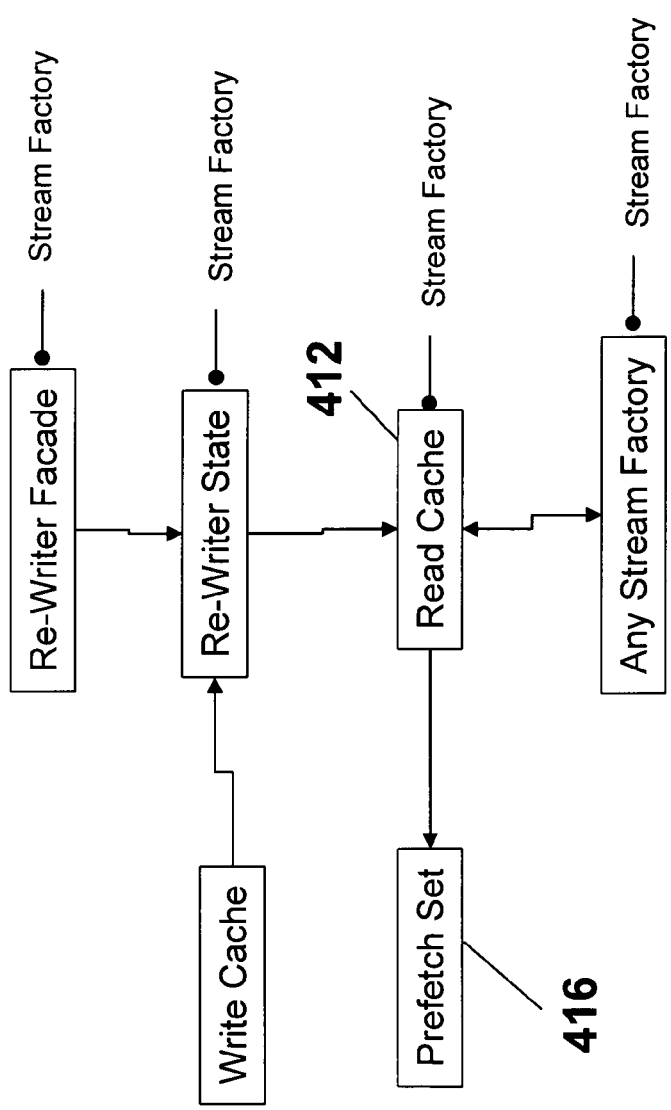
FIG. 4 is a re-writer class diagram, in accordance with an exemplary embodiment of the present invention.

FIG. 4 is a re-writer class diagram in accordance with an exemplary embodiment of the present invention. At various stages in the processing chain, streams are reproduced.

Reproduction of the streams is accomplished by a stream factory. A stream factory is an abstraction. In essence, the stream factory augments a standard read-only forward-only stream by allowing multiple readers and repeated scans of the data in the stream. Every stream cloned by a stream factory provides read-only, forward-only access to the underlying data. Access is provided to individual segments, rather than the entire stream. Stream factories are chained in a tree like structure that corresponds to the sequence of read, write and clone requests issued by the user. The ultimate source stream factory is implemented on top of the source hierarchical document. In addition to reproducing streams, a stream factory also determines if produced streams differ from received streams. The stream factory also provides a value indicating if the input and output streams differ.

FIG. 4 also illustrates read cache 412 and prefetch set 416 coupled together. The read cache 412 encapsulate a source stream factory and associated cache information (e.g., queries and their results). When a pass over the data is necessitated, all unresolved queries in the associated prefetch set 416 are executed and their results cached. This is achieved using a mutator. A read cache contains canonical queries.

As shown in FIG. 4, the read cache 412 is coupled to the prefetch set 416. The read cache 412 obtains queries from the prefetch set 416. Prefetch sets are sets of canonical queries associated with the document that are of interest in the context of the input document. Multiple prefetch sets can be associated with a document. A prefetch set can be associated with the schema of the document, signifying that the queries are of interest for any instance of the schema. A prefetch set can be used in an ad-hoc manner on a per document instance basis. In one embodiment, prefetch sets are arranged in a nested structure and support the following operations: (1) add a nested set, (2) add a query, and get a set of all nested queries.

The read cache 412 supplies source streams, prefetches queries, executes read queries, and asserts queries. The source stream obtained from the read cache 412 is identical in its content to a one obtained from the read cache's source. However, as the consumer of a stream obtained from a read cache consumes the stream, it will trigger the resolution of unresolved queries and will store their results in the read cache.

If there is a difference between the set of queries in the associated prefetch set 416 and the set of cached queries in the read cache 412, then a mutator stream is created by the read cache with the purpose of obtaining the values of queries by which the sets differ. As the client consumes the stream in segments, and queries are satisfied, the mutator 414 fires callbacks which are serviced by the read cache 412 and which causes the read cache 412 to update itself with the obtained values for the satisfied queries. When consumption of the stream in segments is completed, the stream fires a completion callback, which is again serviced by the read cache 412. Then, those queries that were not satisfied are cached negatively (it is remembered in the read cache 412 that these queries do not appear in the input). The read cache 412 forwards a request to an associated prefetch set 416 to prefetch a query.

Figure 5:
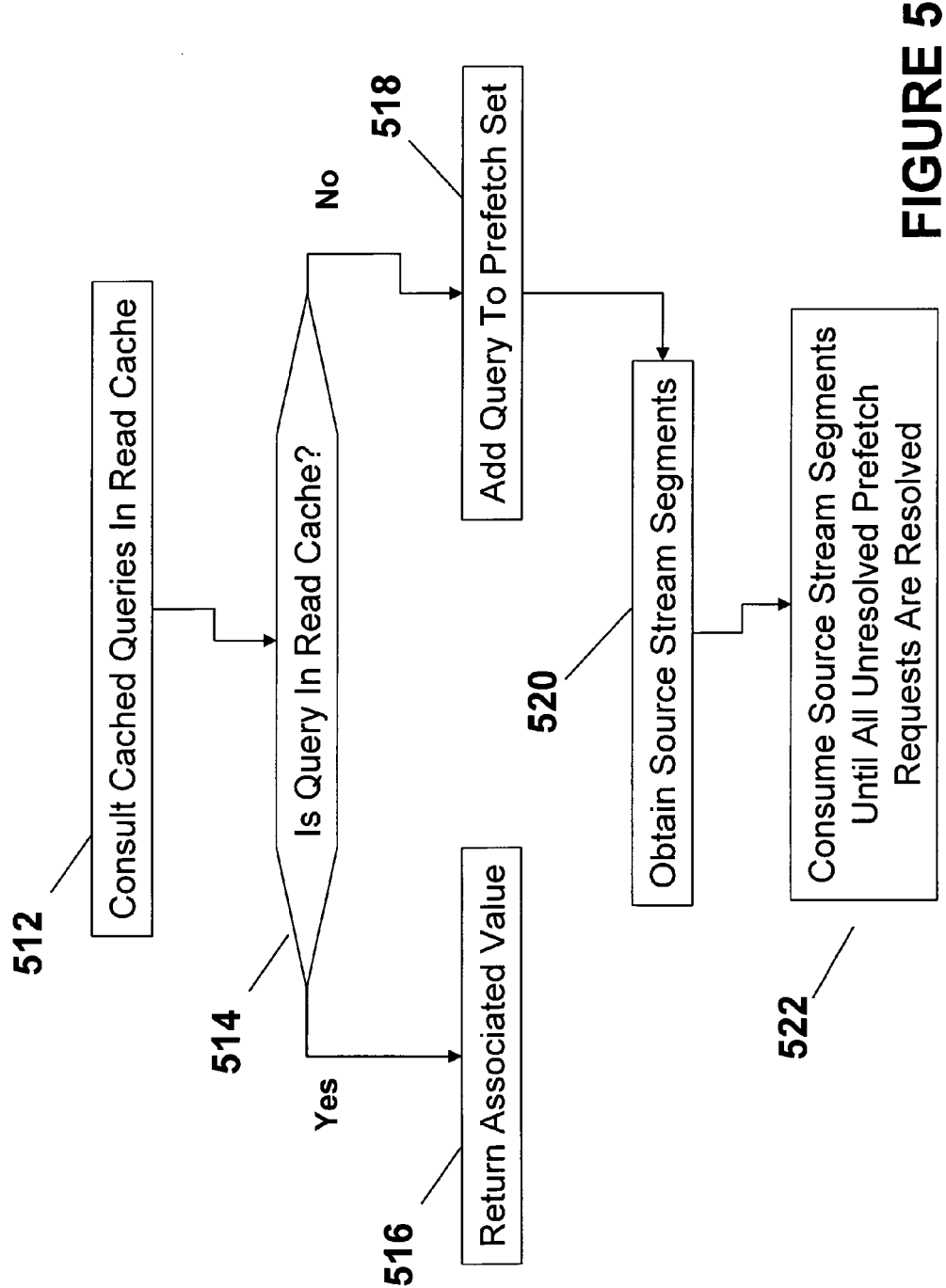
FIG. 5 is a flow diagram of an exemplary process for executing a read query by a read cache in accordance with an embodiment of the present invention.

FIG. 5 is a flow diagram of an exemplary process for executing a read query by a read cache. To execute a read query, canonical queries are submitted for execution at the read cache level. At step 512, the set of cached queries in the read cache is consulted. If the query being sought is in the read cache (step 514), the associated value is returned at step 516. Note that the associated value may be an indicator signifying that the query is not satisfied by the source document. If on the other hand the query is not cached in the read cache (step 514), then the sought after query is added to the prefetch set at step 518. A source stream is obtained at step 520. This source stream is obtained in segments. The source stream is consumed, segment by segment, until all unresolved prefetch requests are resolved at step 522. At this point the query's result or a "missing" indicator is then guaranteed to be in the cached queries set, and this value is returned to the caller.

To assert a query, canonical queries are submitted for execution at the read cache level. As described above, some queries and their results are persisted by upstream components in detachment from the actual document. When the document is large, it is economical for down-stream components to first load from storage only the set of pre-computed queries. The read-cache 512 facilitates the recall of such pre-computed queries by providing an assert method which takes a query and associated value and remembers their result in the cached queries set. It is up to the caller to guarantee the fidelity of the asserted query and value to the underlying data.

Write caches provide lazy-evaluation for write requests. They store the <query, value>pairs for write requests issued by the user. Write caches are consulted during subsequent read and write operations and when an output stream is requested. A write cache contains canonical queries except for one special case which occurs in the implementation of unsafe writes.

A re-writing stream factory (also referred to as the rewriter) is a stream factory that provides all of the user-visible operations performed by the random access simulation process. Some of the operations, however, replace the front-end re-writer that the user interacts with. To that end, there is a facade class placed between the user and current front end rewriter. This facade simply forwards requests to the current re-writer and replaces the current re-writer as required by the various operations.

A re-writer holds on to read and write caches. The read cache can be shared between multiple re-writers as it is semantically immutable. The write cache, however, is owned by a specific re-writer as it defines the unique output generated by the re-writer relative to the source stream factory. When the write cache is empty the re-writer is deemed clean. Conversely, if there are writes pending, the output stream differs from the input stream by the effects of these writes. In that case, the re-writer is deemed dirty. Functions performed by a re-writer include creating a new re-writer, obtaining an output stream, cloning, executing a read query, executing a write request, and prefetching.

Figure 6:
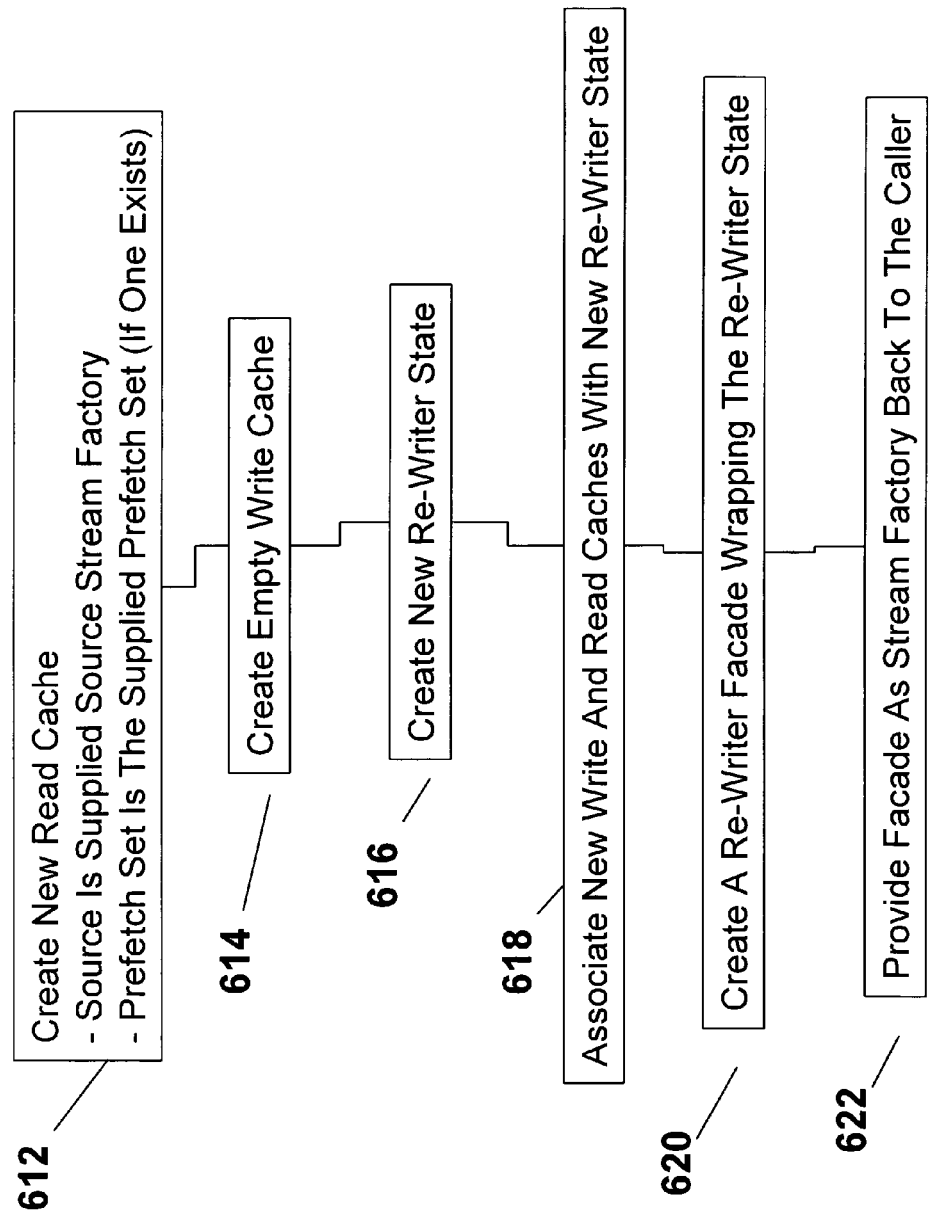
FIG. 6 is a flow diagram of an exemplary process for creating a new re-writer in accordance with an embodiment of the present invention.

FIG. 6 is a flow diagram of an exemplary process for creating a new re-writer. At step 612, a new read cache is created with its source being the supplied source stream factory. The read cache's prefetch set is the supplied prefetch set, if any was provided. An empty write cache is created at step 614. A new re-writer state is created in step 616. The new read and write caches are associated with the new re-writer instance at step 618. At step 620 a re-writer facade wrapping the new re-writer state is created. This facade exposes a stream factory interface which is returned to the user in step 622.

The clone operation produces a re-writer that is logically distinct from the current re-writer but initially produces the same streams. Subsequent operations on the clones are logically independent. Cloning is realized by sharing the original read cache by the clones and duplicating the write cache so that the clone gets its own write cache. Multiple clones can share the same read cache and through it, a prefetch set. Thus each clone can benefit from each other's prefetching and source caching operations.

Figure 7:
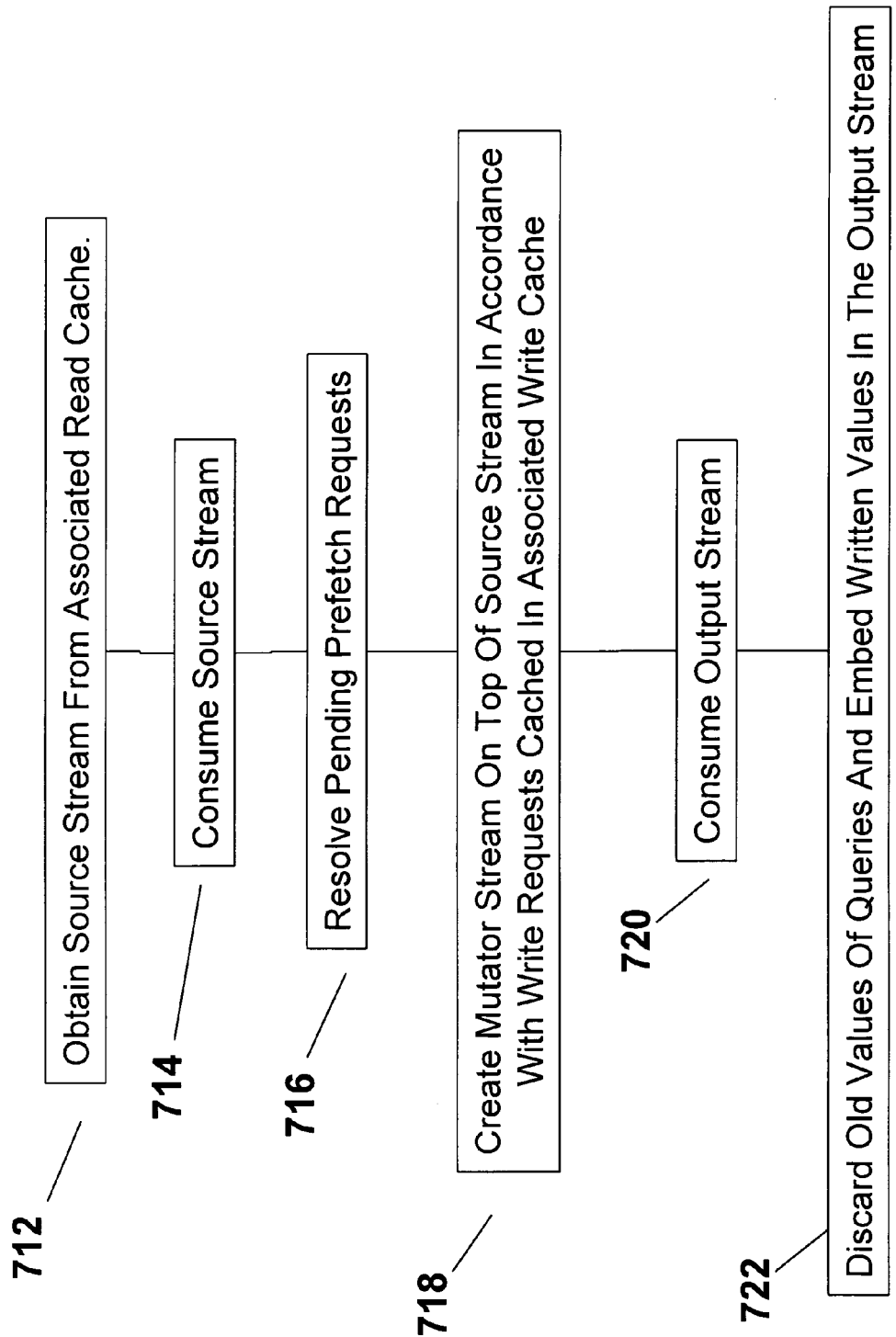
FIG. 7 is a flow diagram of an exemplary process for obtaining an output stream of a re-writer in accordance with an embodiment of the present invention.

FIG. 7 is a flow diagram of an exemplary process for obtaining an output stream of a re-writer. Obtaining an output stream includes creating a re-written stream by first obtaining a source stream from the associated read cache. This stream is then fed into a mutator stream, along with the write cache, which is copied by value. The resulting stream represents the original stream plus any modifications that apply at the moment the stream was created. A source stream is obtained from the associated read cache at step 712. As this source stream is consumed at step 714, pending prefetch requests are resolved at step 716. A mutator stream is created on top of the source stream at step 718. The mutations specified are governed by the write requests that are cached in the associated write cache. As the output stream is consumed at step 720, and queries corresponding to write requests are hit, their old values are discarded and instead the written values (values indicative of the resolution of the queries on the output stream) are imbedded in the output stream at step 722. For any prefetch request in the associated prefetch set which does not already appear in the read cache, a callback mutation is created. If the query is satisfied during output stream consumption, the query and its input value in the read cache are associated. The callback leaves the original value unchanged. For any write request in the write cache a mutation request is created. If the query is satisfied during output stream consumption, the new value instead of the original value is written.

Figure 8:
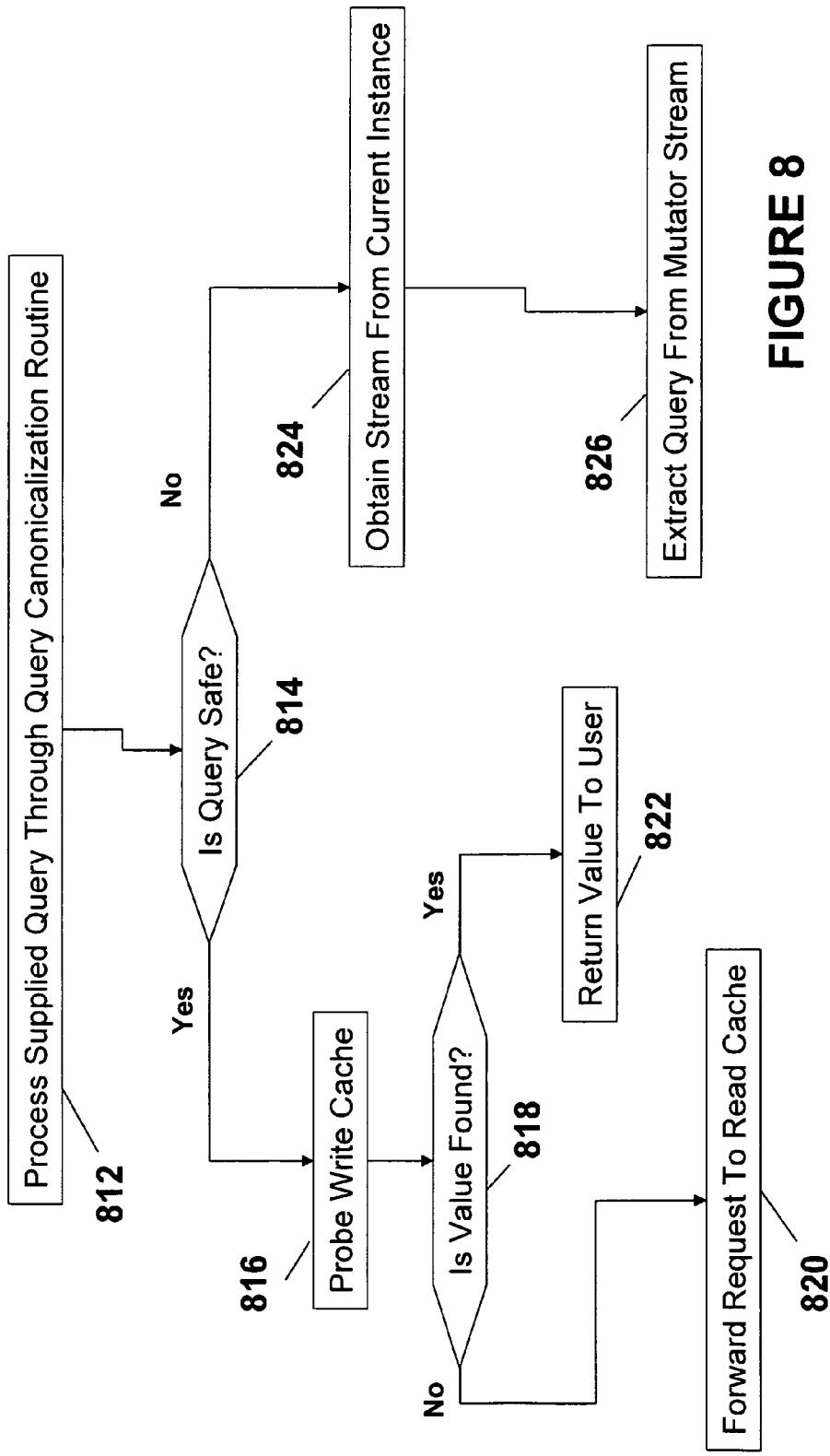
FIG. 8 is exemplary process for executing a read query by a re-writing stream factory in accordance with an embodiment of the present invention.

FIG. 8 exemplary process for executing a read query by a re-writer stream factory. The supplied query is processed through the query canonicalization routine at step 812. At step 814, this yields either a canonical, safe, query or the original query, which is deemed to be unsafe at this point. Safe and unsafe reads are treated differently. A safe read first probes the write cache at step 816. If the value is found there at step 818, it is returned to the user at step 822. Otherwise (step 818), the value of the query must be identical to that of the source, so the request is forwarded to the read cache at step 820. Going back to step 814, if the read is unsafe, then a stream is obtained from the current instance at step 824. This stream encapsulates all of the writes applied to the current instance. Using this stream, the query is extracted in an ad hoc manner using a mutator stream,created specifically to extract the given query at step 826.

Figure 9:
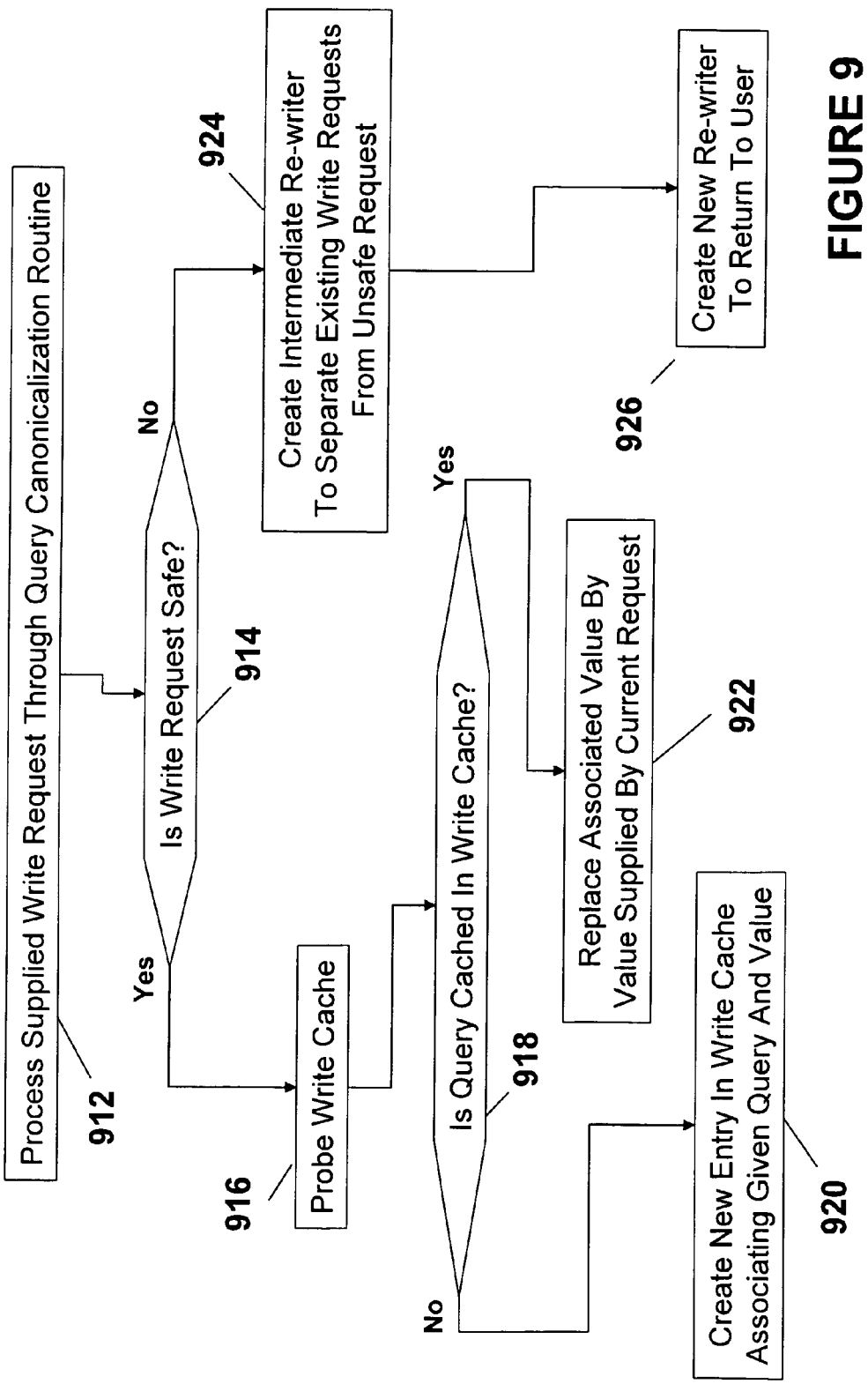
FIG. 9 is an exemplary process for executing a write request by a re-writing stream factory in accordance with an embodiment of the present invention.

FIG. 9 is an exemplary process for executing a write request. The write operation, similar to the read operation, is processed by the query canonicalization procedure at step 912. At step 914, this is determined to be safe or unsafe. Safe writes are resolved in the write cache level. Thus, if deemed safe at step 914, the write cache is probed at step 916. If the query is already cached in the write cache (step 918), then the associated value is replaced by the one supplied by the current request at step 922. Otherwise (step 918) a new entry is created in the write cache, associating the given query and value at step 920. Unsafe writes are more complex due to the following liabilities. Unsafe writes should be shielded from the (safe) queries already existing in the write cache because they can alias the same value node. Application of these aliased queries to the data can result in lost write requests. Unsafe writes should be shielded from future safe read requests because, again, they might alias the same value node. In this case, the unsafe write is invisible to the read request. Two new re-writers are created at step 924 and step 926. The first new re-writer created at step 924 separates between the existing write requests and the new unsafe request. Note that the original read cache is discarded because its fidelity to the resulting stream can no longer be guaranteed. The second new re-writer created at step 926 is returned to the user and is superimposed on top of the second one to separate future reads from the unsafe write. Note that the original prefetch set is inherited by the new top-level re-writer assuming that the user is still interested in finding out the values for the contained queries.

Figure 10:
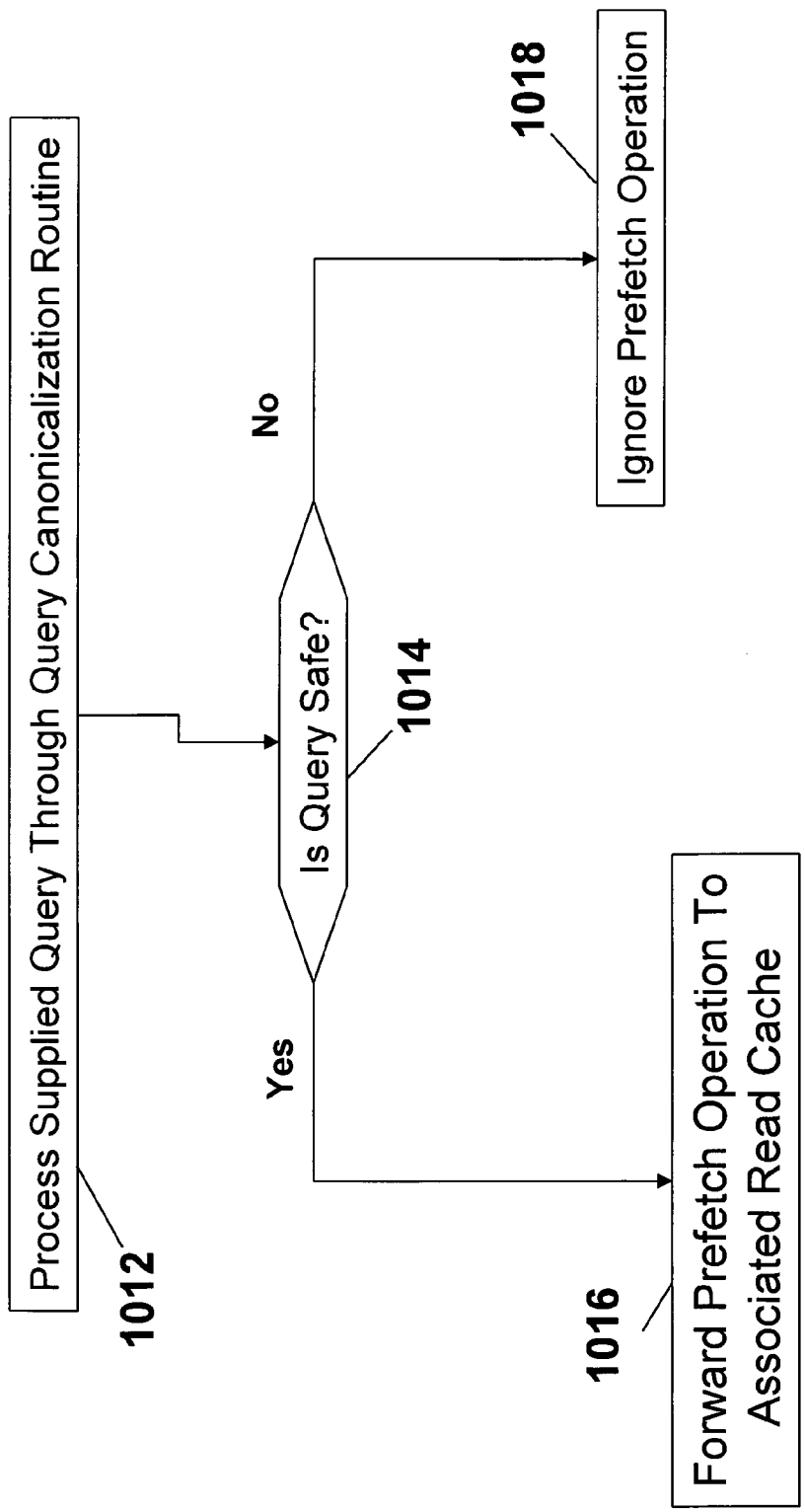
FIG. 10 is an exemplary process for prefetching in accordance with an embodiment of the present invention.

FIG. 10 is an exemplary process for prefetching. Only safe queries are prefetched. The query is supplied to the query canonicalization routine at step 1012. If the query is safe at step 1014, the prefetch operation is forwarded to the associated read-cache at step 1016. Otherwise (step 1014), the prefetch operation is ignored at step 1018.

A process usually involves the exchange of many documents. As such, documents are retrieved from and stored back into backing store; copies of documents are created and manipulated individually. In addition to the operations described above, when manipulating multiple documents, it is also desirable to maximize information sharing and minimize access to backing storage. To accomplish this, each process has an associated document registry that keeps track of the process's documents. The client does not access documents directly. Rather the documents are accessed through reference counted handles which serve as keys into the document registry. Thus providing the ability to share document content through document handles such that no actual copying of documents is made unless it is required (copy on write optimization). Each document can have multiple representations. One possible representation that is particularly useful for large documents is that of a re-writing stream factory, as described above. Another possible representation is an in-core node tree. A document registry as described above allows sharing of document content transparently between clients, caches document representations, provides transformation between the different possible representations, and has the logic to implement operations using the most suitable available representation.

A client can request duplication of a document handle. The implementation keeps a reference count attached to a handle. Copying a document simply increases the reference count on the handle and returns the same handle as the cloned document handle. The client is responsible for releasing a document handle. When the handle count reaches zero, the document and all its in-core representations are released from memory.

When a client wishes to apply a write request to a document handle, the reference count of the document is first checked. In an exemplary embodiment, if the reference count equals one, then the client has exclusive access to the underlying document and the write request may be executed directly on the underlying document. Otherwise, the underlying document is cloned. This entails picking any single available representation of the underlying document and cloning it. The best representation is then chosen from the set of the available representations depending on the nature of the write request. The resulting document is registered in the document registry and a new handle to this newly registered document is obtained. The reference count of this handle is equated to one. The write operation is applied to the new document, and the reference count on the original handle is decremented.

An embodiment of the present invention provides a look-ahead event-generating read stream. A look-ahead event-generating read stream allows subscribers to be notified whenever the stream is consumed, such as before the first read, after each read, and after the last read. This provides a lightweight extensibility mechanism. The look-ahead event-generating read stream also provides limited seeking through checkpoint-rollback. The consumer of a stream can checkpoint the current position in a stream, continue reading past that point, and later either revert to the original position or discard the checkpoint position. When a checkpoint position is in effect, the underlying data is buffered as the client consumes it. If the client decides to revert back to the checkpoint position, the input is re-played out of the buffer. When the client discards the checkpoint position, the buffered input is discarded. This mechanism allows look-ahead algorithms, wherein the consumer peeks into the data to read the several next few items to make further decisions about the processing of the stream.

An embodiment of the present invention provides an automatic encoding detection stream. Given a source stream, the automatic encoding detector creates another look-ahead read stream that looks ahead up to the first four bytes in the source stream to detect its encoding. The returned stream is then reset to its original position, by discarding the checkpoint used, and the detected encoding is returned to the caller.

Mapping Streams to Transport's Native Capabilities and Pipeline Processing

Figure 11:
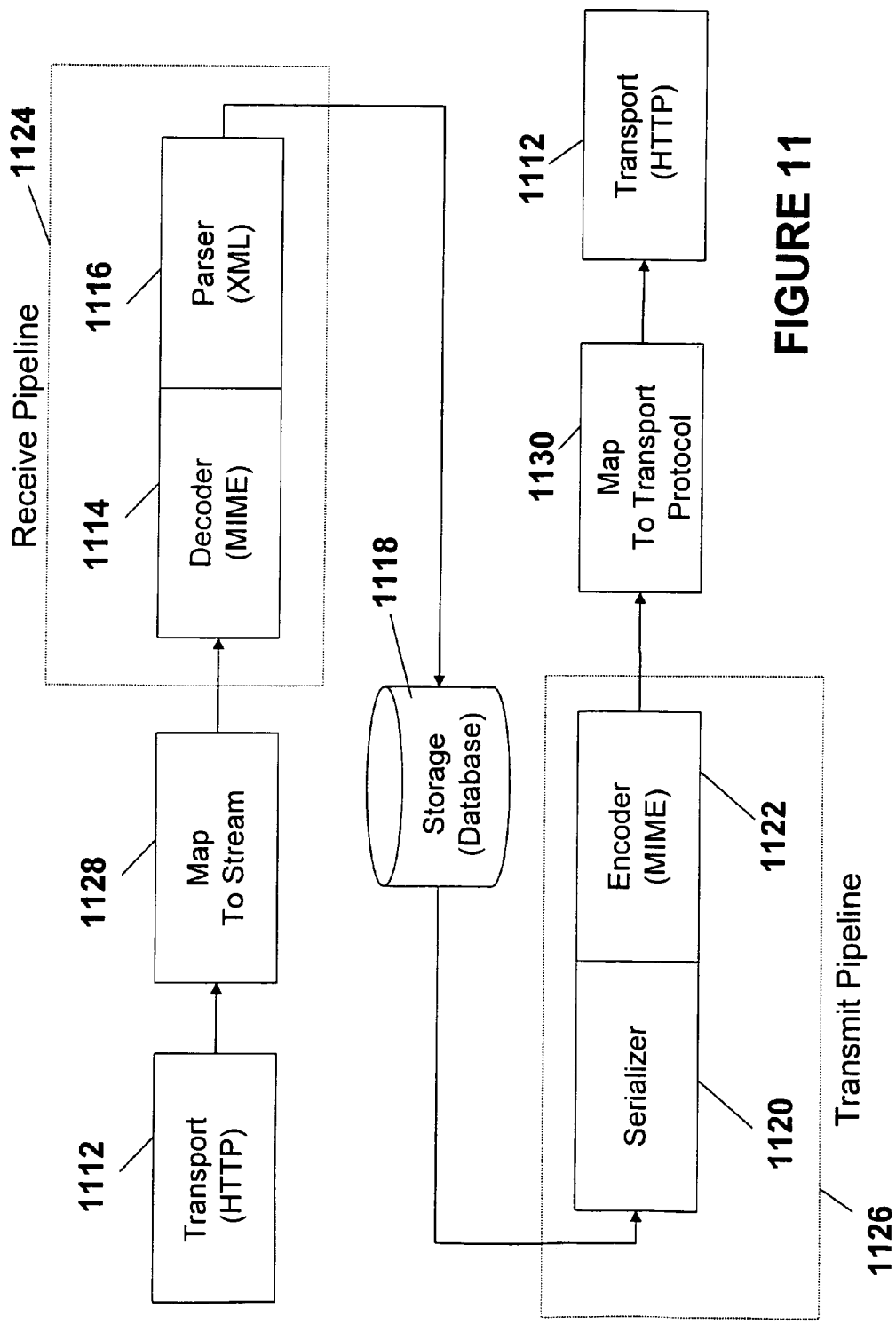
FIG. 11 is a block diagram of exemplary pipeline processing components and mapping components in accordance with an embodiment of the present invention.

FIG. 11 is a block diagram of exemplary pipeline processing components and mapping components in accordance with an embodiment of the present invention. Messages are received and transmitted over a transport 1112 such as HTTP and File Transport for example. Large message are handled by a particular transport in a manner dictated by the transport's protocol. For example, HTTP uses chunk encoding to transport large messages, whereas File Transport does not use chunk encoding. In order to ensure compatibility between steaming data within the system and transported messages, the streams are mapped to the transport's particular (native) capabilities by mapping components 1128 and 1130. In one embodiment, for an HTTP transport, received chunk encoded messages are mapped into streams by the mapping component 1128, and streams to be transmitted are mapped into chunk encoded messages by the mapping component 1130. The size of a stream segment can be the same size as a chunk, or multiples of a chunk. In another embodiment, for File Transport, streams are created by mapping a small region of the received file as memory to form a stream segment by mapping component 1128. The stream segments are mapped to the File Transport to transmit large messages by mapping component 1130. This can be accomplished, for example, via a Windows NT® operating system.

The pipeline depicted in FIG. 11 comprises a decoder component (decoder) 1114, a parser component (parser) 1116, a storage component 1118, a database), a serializer component (serializer) 1120, and an encoder component (encoder) 1122. The receive pipeline 1124 comprises the decoder 1114 and the parser 1116. The transmit pipeline 1126 comprises the serializer 1120 and the encoder 1122. The receive pipeline 1124 receives messages from the transport 1112, and the transmit pipeline 1126 provides messages to the transport 1112. The parser 1116 parses inbound messages from a source format and breaks the messages up into individual business documents. The serializer 1120 batches up individual business documents as well as serializing the batch into the target format.

Pipeline components process messages on-demand; in other words, instead of processing messages at the time the component is invoked, they produce stream objects that allow down-stream components to "pull" the data when they need it. Components are discouraged from processing messages as a whole. Instead, processing of data occurs only when the Read method of the Stream object on the stream is invoked. There are two pulling mechanisms. The primary mechanism can be applied to all messages—opaque or clear. This mechanism partitions the messages into segments. The boundary of each pull (size of each segment) is arbitrary and is determined by the current offset in the stream and the length of data to copy. On the other hand, to pull clear (e.g., XML) data, components read data in logical units (e.g. an XML node) in a loop and accumulate data in a buffer until enough data is produced to satisfy the segment size.

During pipeline processing, streams are composed into chains. At the terminal end of a chain, read requests are issued and travel all the way up the chain, and then down. Only the amount of data requested is fetched from the ultimate source and it goes through arbitrary processing and transformation as it travels back from the source to the ultimate consumer. At this time, components are expected to perform a small amount of work to generate enough data to satisfy the read request. In order to perform this work, a component may need data from its upstream component. This will trigger a chain of events along the pipeline and cause the ultimate provider of data to pull data from the transport. This delayed execution eliminates the need to store intermediate results in memory or disk. Messages are stored or transmitted only by end consumers of the data.

Figure 12:
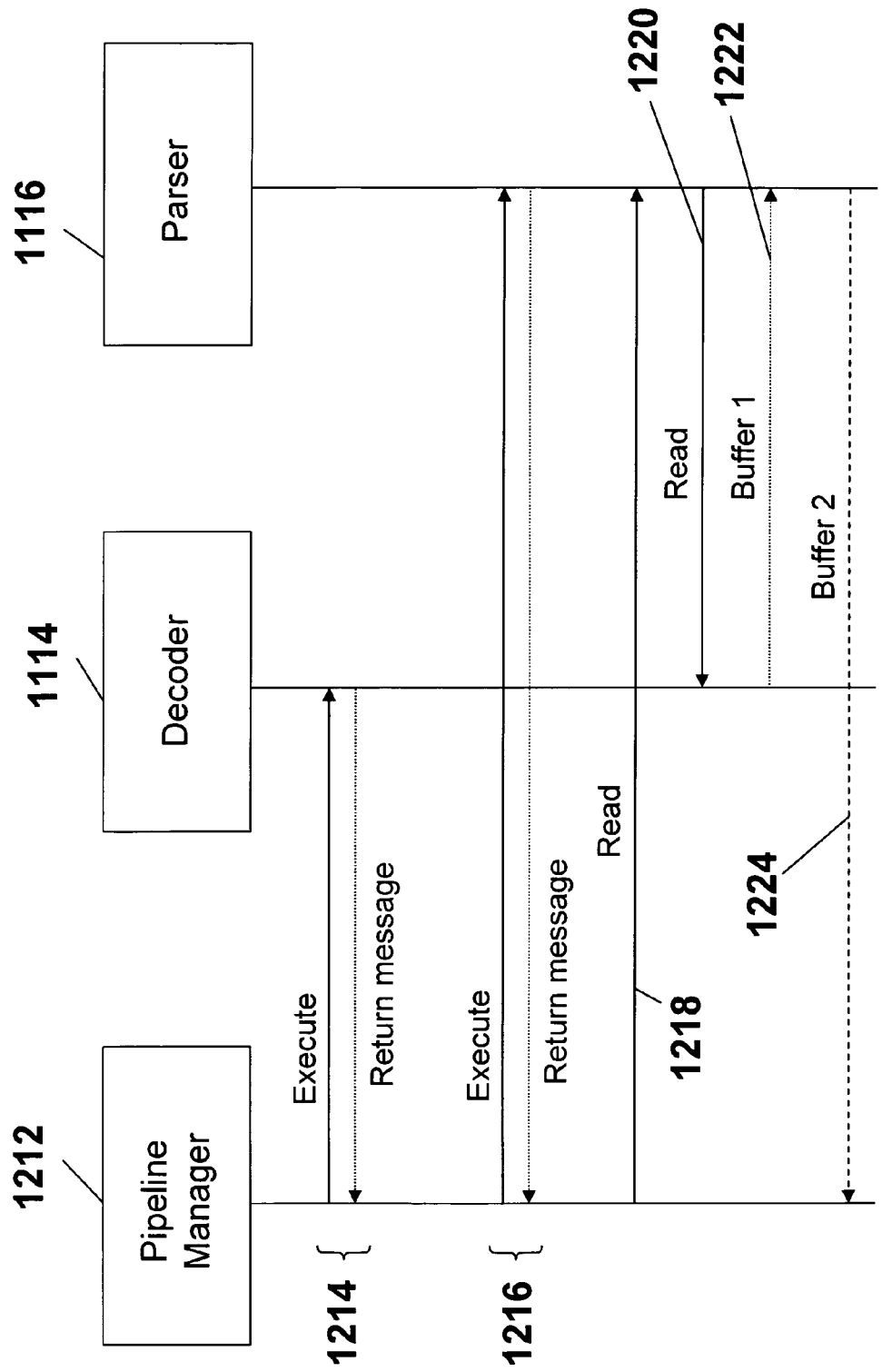
FIG. 12 is an exemplary timing diagram of a portion of the pipeline process in accordance with an embodiment of the invention.

FIG. 12 is an exemplary interaction diagram of a portion of pipeline processing in accordance with an embodiment of the invention. A streaming component in a pipeline returns control back to a pipeline manager 1212 the moment it finishes preparing for an execution, as indicated by execution/return message pairs 1214 and 1216. Message data are generated on-demand by read requests from components downstream. Upon receiving a read request 1218 from a next component, a typical component in the pipeline issues a read request 1220 to its previous component. Once a piece of data is returned from the previous component (buffer 1, 1222), the component receiving the data processes the data and returns "enough" resultant data (buffer 2, 1224) to the next component. This process ends when the ultimate consumer stops asking for data or the ultimate producer runs out of data.

For example, referring to FIG. 11, suppose a receive pipeline 1124 contains a MIME (Multipurpose Mail Extensions) decoder 1114 and an XML parser 1116 that receives messages from an HTTP transport 1112 and sends data to a database 1118. The processing of data doesn't occur at the time when individual components are executed. Rather, individual components typically construct a read-only and forward-only stream (described below) and hand it to the down stream component at this time. When the control finally reaches the end of the pipeline and the data is to be written to the database 1118, the persistence process starts issuing read calls against the stream object. At this point, a chain of events is triggered. Upon receiving the read request in its stream object, the XML parser 1116 starts parsing the data. The XML Parser 1116 does not parse the whole message in one shot; doing so will force it to store intermediate results in some sort of storage, defeating the purpose of minimum memory footprint. Rather, the parser 1116 produces enough data to satisfy the read request. The parser 1116 performs piece-meal parsing and on-the-fly evaluation of queries (e.g., XPath queries). The parsing activities cause one or more read requests be issued against the stream that the XML parser 1116 receives from its up-stream component (the MIME decoder 1114). The MIME decoder 1114 functions in a very similar way: it performs MIME decoding in an streaming fashion. Again, this triggers one or more read calls against the stream provided by the HTTP transport 1112. The HTTP transport 1112, upon receiving the read call, issues read requests against a request object or a network buffer directly. Thus, no message is completely held in memory at any time during the inbound processing until it reaches its final destination (the database 1118). Similar processing occurs on the outbound portion (transmit pipeline 1126) as well, only this time the final destination is the partner-that receives the message.

There are two types of virtual streams. One is referred to as a read-only-seekable-stream and the other is referred to as a virtual-stream that is read/write. The read-only-seekable-stream wraps around a forward-only, read only stream and provides full seekability with minimum memory exposure. Initially, the data is held in the memory. Once the stream pointer moves beyond the memory region, data is over-flowed to an overflow stream that is readable, writeable, and seekable. This stream translates the external seek position to either the buffer offset or seek position of the overflow stream. On the other hand, the virtual-stream provides full read, write, and seek capabilities. The virtual-stream commits only a small amount of memory. The constructor of the virtual-stream simply takes one argument (the required memory size) and overflows to an operating system temporary file as necessary.

Fragmented Storage

Scalable storage in accordance with an embodiment of the present invention utilizes a message agent component to provide the capability to stage fragments into a database and route messages when a complete message has been formed. The message agent component also provides a complete view of the fragmented message at delivery. That is, the message agent component assembles the fragments to form a complete message stream. Fragmentation can be controlled explicitly by a client or transparently done within the message agent. The size of a fragment can be any appropriate size suitable for storing data in a storage mechanism, such as a database. For most storage mediums, and especially for databases, the native unit for holding binary data has an optimal size for the data stored, beyond which it is more economical to split the data into multiple native units. For example, in the case of SQL databases, there is such an optimum size for the amount of data stored in a blob table.

In one embodiment, a database table contains document data. The database table comprises, document meta-data, cached queries and their results, a first fragment of each document's data, and identification information of other fragments and their sizes. As a document is retrieved from the database, the row containing the document's data in the database table is read in its entirety into memory. Thus, the first fragment along with pre-computed information is made available to the application upfront. Fragmentation is transparent to a client. When the client consumes the document's data, fragmentation is completely hidden from the client. Thus, from the client's perspective the document appears as a complete entity. The database layer presents a single stream over the collection of fragments. This is achieved using the fragment information which is stored in the document table. Thus, for any read or seek request, the database stream knows which fragments need to be accessed to satisfy the request. The database stream requires at most one data-fragment to be loaded in memory at any point of time. The data-fragments are loaded from the database on demand and the size information of fragments is cached internally to reduce database access. This way the fragmentation of the document remains hidden from the reader.

When the client stores document's data, the data can be explicitly fragmented by the client or the data can be implicitly fragmented. To explicitly fragment the data, the database layer exposes an API (application program interface) for explicitly adding fragments in any order. The client provides a stream and an index for each fragment. The client notifies the database layer when all fragments have been staged.

To implicitly fragment data, the database layer exposes an API that automatically fragments the document data if the data exceeds a certain threshold size. The document data-stream is treated as a read-only forward-only stream. As the data is read-forward, fragmentation takes place automatically. Database persistence boundaries are inserted between fragments, so that they are persisted one at a time. This ensures that the whole document data is not loaded in memory all at once. This technique is helpful for the document publishers who can provide a forward read-only and reproducible stream for the document data (e.g., a stream that can be reset back to its beginning).

As noted in the previous section, upstream components save cached queries and their results in detachment from the document data itself Thus, this data is made available to downstream components without the need to re-query the data. Given a document schema, the user specifies which fields are of interest for routing, handling and tracking. These translate into queries which are deployed into the database and are assigned a unique query ID. Thus, there is agreement throughout the system as to which queries are worthwhile caching and how to identify them.

Streaming Consumption of Data During Tracking and Debugging Sessions

Scalable storage and processing of hierarchical documents in accordance with an embodiment of the present invention provides streaming consumption of data during tracking and debugging sessions. A business process is tracked for activities and the value of variables, including messages, for logical viewing of the process flow. Tracking messages and correlating message instances are desirable for auditing, monitoring and debugging business processes.

When an XLANG/s program is compiled (referred to as an orchestration), the generated executable has tracking calls generated at every activity boundary and these calls translate to runtime events. Each track event contains activity type, operation data and event data. Track events are provided to registered subscribers. These subscribers are termed tracking components and their primary goal is to collect data regarding XLANG/s orchestration instances. The data is then flushed at persistence boundaries to the database for processing by tracking services.

In one embodiment of the hierarchical document random access process described above, an explicit event is fired when a message is about to be constructed in the XLANG/s runtime. Upon receipt of the construction event the interceptors execute a prefetch step wherein a list of queries (e.g., in the form of XPath expressions) that they are interested in is specified. Thus, since all queries are specified upfront, resolving their values necessitates at most a single pass over the data. Furthermore, this pass can be required to satisfy process level user read requests, so it is not incurred for tracking per-se.

In an exemplary embodiment of the present invention, an XLANG/s process instance is debugged using a debugging tool referred to as the Business Reporting and Monitoring tool (BRMA). The BRMA tool allows a user to attach to an XLANG/s process instance and trace through the activities, to view messages, and to view the state of an instance. The XLANG/s process instance messages are saved to disk for debugging purposes. The messages are streamed across remoting boundaries from the runtime server to the BRMA client. In order to facilitate this without any degradation in server performance, the messages are wrapped as an object and passed to the client by reference. The BRMA client then retrieves the messages as streams and these streams are written in chunks to the file on disk.

A method for processing hierarchically structured streaming data as described herein may be embodied in the form of computer-implemented processes and system for practicing those processes. A method for processing hierarchically structured streaming data as described herein may also be embodied in the form of computer program code embodied in tangible media, such as floppy diskettes, read only memories (ROMs), CD-ROMs, hard drives, high density disk, or any other computer-readable storage medium, wherein, when the computer program code is loaded into and executed by a computer, the computer becomes a system for practicing the invention. The method for processing hierarchically structured streaming data as described herein may also be embodied in the form of computer program code, for example, whether stored in a storage medium, loaded into and/or executed by a computer, or transmitted over some transmission medium, such as over the electrical wiring or cabling, through fiber optics, or via electromagnetic radiation, wherein, when the computer program code is loaded into and executed by a computer, the computer becomes a system for practicing the invention. When implemented on a general-purpose processor, the computer program code segments configure the processor to create specific logic circuits.

The various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. One or more programs that may utilize the signal processing services of the present invention, e.g., through the use of a data processing API or the like, are preferably implemented in a high level procedural or object oriented programming language to communicate with a computer. However, the program(s) can be implemented in assembly or machine language, if desired. In any case, the language may be a compiled or interpreted language, and combined with hardware implementations.

The methods and apparatus of the present invention may also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, or a receiving machine having the signal processing capabilities as described in exemplary embodiments above becomes an apparatus for practicing the invention. When implemented on a general-purpose processor, the program code combines with the processor to provide a unique apparatus that operates to invoke the functionality of the present invention. Additionally, any storage techniques used in connection with the present invention may invariably be a combination of hardware and software.

While embodiments of the present invention has been described in connection with the preferred embodiments of the various figures, it is to be understood that other similar embodiments may be used or modifications and additions may be made to the described embodiment for performing the same function of the present invention without deviating therefrom. Furthermore, it should be emphasized that a variety of computer platforms, including handheld device operating systems and other application specific operating systems are contemplated, especially as the number of wireless networked devices continues to proliferate. Therefore, the present invention should not be limited to any single embodiment, but rather should be construed in breadth and scope in accordance with the appended claims.

What is claimed is:

1. A computer-readable medium having computer-executable instructions for processing a data stream embodying a hierarchically structured document by performing acts comprising:

partitioning said data stream into fixed length segments utilizing said hierarchical structure to determine a length of each fixed length segment;

processing said fixed length segments in a pipeline fashion;

creating a new read cache comprising existing unresolved queries and receiving a source data stream, wherein a read cache is utilized to read a fixed length segment of passing stream data;

creating an empty write cache, wherein a write cache is utilized to provide fixed length segments of stream data;

associating said empty write cache with an existing instance of a re-writer, wherein a re-writer is utilized to provide a copy of a fixed length segment of stream data; and providing a copy of said source data stream as an output data stream from said empty write cache.

2. A computer-readable medium in accordance with claim 1, further comprising:

determining if a read-query to read said data steam is safe, wherein a safe read-query is a semantically correct query;

if said read-query is safe:
searching a write cache for a value associated with said read-query;
if said value is found in said write cache, returning said value to a user;
if said value is not found in said write cache, forwarding said read-query to a read cache;

if said query is not safe:
obtaining said output stream from a current instance; and
extracting said read-query from said obtained output stream.

3. A computer-readable medium in accordance with claim 1, further comprising:

determining if a write request to write a data steam is safe, wherein a safe write request is semantically correct;

if said write request is safe:
- searching a write cache for a value associated with said write request;
- if said value is found in said write cache, replacing said associated value with a value of said write request;
- if said value is not found in said write cache, creating a new entry in said write cache having said value of said write request;

if said write request is not safe:
- creating an intermediate stream writer for separating existing write requests from said unsafe write request;
- creating a new stream writer; and
- returning said new stream writer to a user.

4. A computer-readable medium having computer-executable instructions for processing a data stream embodying a hierarchically structured document by performing acts comprising:

partitioning said data stream into fixed length segments utilizing said hierarchical structure to determine a length of each fixed length segment;

obtaining a fixed length segment of source stream data from an associated read cache;

consuming said fixed length segment of source stream data;

resolving pending queries on said source stream data;

creating a mutator stream of data from said source stream of data, wherein mutations in said mutator stream are in accordance with write requests cached in an associated write cache;

consuming an output stream of data from said mutator stream of data; and resolving queries on said output stream;

discarding resolved queries; and embedding values associated with said resolved queries in said output stream.

* * * * *